United States Patent
Lv et al.

(10) Patent No.: US 9,871,645 B2
(45) Date of Patent: Jan. 16, 2018

(54) METHOD, APPARATUS, AND SYSTEM FOR TRANSMITTING DATA

(71) Applicant: HUAWEI TECHNOLOGIES CO., LTD., Shenzhen, Guangdong (CN)

(72) Inventors: Yongxia Lv, Beijing (CN); Chaojun Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 14/043,027

(22) Filed: Oct. 1, 2013

(65) Prior Publication Data

US 2014/0029552 A1 Jan. 30, 2014

Related U.S. Application Data

(63) Continuation of application No. PCT/CN2012/073299, filed on Mar. 30, 2012.

(30) Foreign Application Priority Data

Apr. 1, 2011 (CN) .......................... 2011 1 0082286

(51) Int. Cl.
*H04L 1/18* (2006.01)
*H04L 5/00* (2006.01)

(52) U.S. Cl.
CPC .......... *H04L 5/0092* (2013.01); *H04L 1/1822* (2013.01); *H04L 1/1854* (2013.01);
(Continued)

(58) Field of Classification Search
None
See application file for complete search history.

(56) References Cited

U.S. PATENT DOCUMENTS 8,559,343 B2 * 10/2013 Parkvall ............... H04B 7/2656
370/280
2007/0113138 A1 5/2007 Kwon et al.
(Continued)

FOREIGN PATENT DOCUMENTS

CN 101651529 A 2/2010
CN 101932039 12/2010
(Continued)

OTHER PUBLICATIONS

International Search Report dated Jul. 5, 2012, in corresponding International Patent Application No. PCT/CN2012/073299.
(Continued)

*Primary Examiner* — Hassan Phillips
*Assistant Examiner* — Ayanah George
(74) *Attorney, Agent, or Firm* — Staas & Halsey LLP

(57) ABSTRACT

Embodiments of the present invention disclose a method, an apparatus, and a system for transmitting data and relate to the communications field. In order to enable more flexible configuration of flexible subframes and increase downlink throughput, a technical solution provided in the present invention is as follows: configuring an HARQ synchronization attribute of a data packet, where the HARQ synchronization attribute includes synchronous HARQ or asynchronous HARQ; configuring an HARQ process ID of the data packet when the HARQ synchronization attribute is configured to asynchronous HARQ; and sending downlink control information for scheduling the data packet to a user equipment.

16 Claims, 3 Drawing Sheets

(52) U.S. Cl.
CPC .......... *H04L 1/1887* (2013.01); *H04L 1/1896* (2013.01); *H04L 1/1812* (2013.01); *H04L 1/1825* (2013.01)

(56) References Cited

U.S. PATENT DOCUMENTS

| | | | | |
|---|---|---|---|---|
| 2009/0040928 | A1* | 2/2009 | Wang | H04L 1/1812 370/232 |
| 2009/0307556 | A1* | 12/2009 | Cai | H04L 1/1822 714/748 |
| 2010/0050039 | A1* | 2/2010 | Zhang | H04L 1/1822 714/749 |
| 2010/0081443 | A1* | 4/2010 | Meyer | H04L 1/1812 455/450 |
| 2011/0041027 | A1 | 2/2011 | Fong et al. | |
| 2011/0176461 | A1* | 7/2011 | Astely | H04B 7/2656 370/280 |
| 2011/0182327 | A1* | 7/2011 | Matsumoto | H04L 1/1887 375/132 |

FOREIGN PATENT DOCUMENTS

| | | | |
|---|---|---|---|
| EP | 1 777 867 | A2 | 4/2007 |
| EP | 1777867 | A2 * | 4/2007 .......... H04L 1/0017 |
| WO | 2010/049587 | A1 | 5/2010 |
| WO | 2010/148086 | A2 | 12/2010 |

OTHER PUBLICATIONS

Chinese Office Action dated May 26, 2014 in corresponding Chinese Patent Application No. 201110082286.9.

Extended European Search Report dated Feb. 3, 2014, in corresponding European Patent Application No. 12765863.1.

International Search Report, dated Jul. 5, 2012, in corresponding International Application No. PCT/CN2012/073299 (4 pp.).

* cited by examiner

METHOD, APPARATUS, AND SYSTEM FOR TRANSMITTING DATA

CROSS-REFERENCE TO RELATED APPLICATIONS

This application is a continuation of International Application No. PCT/CN2012/073299, filed on Mar. 20, 2012, which claims priority to Chinese Patent Application No. 201110082286.9, filed on Apr. 1, 2011, both of which are hereby incorporated by reference in their entireties.

TECHNICAL FIELD

The present invention relates to the communications field, and in particular, to a method, an apparatus, and a system for transmitting data.

BACKGROUND

An LTE (Long Term Evolution, Long Term Evolution) system supports a time division duplexing (Time Division Duplexing, TDD) mode, where an uplink (UL, Uplink) and a downlink (DL, Downlink) use different timeslots of the same frequency carrier. An LTE TDD system is able to adjust an uplink-downlink configuration (Uplink-Downlink Configuration) semi-statically according to different service types, so as to meet the requirements of services asymmetric in the uplink and the downlink.

In a conventional LTE technology, which uplink-downlink configuration is used is semi-statically configured and therefore, it may occur that the configured uplink-downlink configuration does not match a transient service type, which leads to ineffective utilization of resources. To make the actually used uplink-downlink configuration better match the transient service type and to utilize communications resources more effectively, a dynamic TDD subframe application technology may be used, where some flexible subframes (flexible subframe) are configured in a radio frame. A flexible subframe may be configured dynamically as an uplink subframe or a downlink subframe. FIG. 1 is a schematic diagram of an application of dynamic TDD subframes in a radio frame, where subframes 3, 4, 8, and 9 of each radio frame are flexible subframes.

During the implementation of the present invention, the inventor finds that, in a dynamic TDD subframe application scenario, uplink transmission is performed in a synchronous HARQ (Hybrid Automatic Repeat Request, Hybrid Automatic Repeat Request) mode, and therefore, transmission of a PDCCH (Physical Downlink Control Channel, physical downlink control channel) for scheduling of a PUSCH (Physical Uplink Shared Channel, physical uplink shared channel), transmission of a PUSCH, feedback of an uplink ACK (Acknowledgement, acknowledgement)/NACK (Non-Acknowledgement, non-acknowledgement), and retransmission of a PUSCH are all performed according to a certain timing sequence relationship. This means that there is a timing relationship between uplink and downlink transmission. Therefore, when a flexible subframe is currently configured as an uplink subframe at the current moment and uplink transmission is performed, for example, when transmission over a PUSCH is performed, because of the timing relationship, corresponding uplink transmission, such as feedback of a corresponding uplink ACK/NACK, needs to be performed in the flexible subframe in a subsequent prescribed timeslot. This may cause that the flexible subframe cannot be configured as a downlink subframe within a certain time, which weakens a gain from configuring the flexible subframe and further reduces downlink throughput.

SUMMARY

Embodiments of the present invention provide a method, an apparatus, and a system for transmitting data, which enable more flexible configuration of flexible subframes and increase downlink throughput in a dynamic TDD application scenario.

In one aspect, the present invention provides a method for transmitting data, including: configuring an HARQ synchronization attribute of a data packet, where the HARQ synchronization attribute includes synchronous HARQ or asynchronous HARQ, and configuring an HARQ process ID of the data packet when the HARQ synchronization attribute of the data packet is set to asynchronous HARQ; and sending downlink control information for scheduling the data packet to a user equipment.

In one aspect, the present invention further provides a base station, including: an attribute configuring unit, configured to configure an HARQ synchronization attribute of a data packet, where the HARQ synchronization attribute includes synchronous HARQ or asynchronous HARQ; a process configuring unit, configured to configure an HARQ process ID of the data packet when the HARQ synchronization attribute of the data packet is configured to asynchronous HARQ; and a control information sending unit, configured to send downlink control information for scheduling the data packet to a user equipment.

In another aspect, the present invention provides a method for transmitting data, including: receiving downlink control information sent by a base station for scheduling a data packet; determining an HARQ synchronization attribute of the data packet according to the downlink control information, where the HARQ synchronization attribute includes synchronous HARQ or asynchronous HARQ; and determining an HARQ process ID of the data packet according to the downlink control information when the HARQ synchronization attribute of the data packet is configured to asynchronous HARQ.

In another aspect, the present invention provides a user equipment, including: a control information receiving unit, configured to receive downlink control information sent by a base station for scheduling a data packet; an attribute determining unit, configured to determine an HARQ synchronization attribute of the data packet according to the downlink control information, where the HARQ synchronization attribute includes synchronous HARQ or asynchronous HARQ; and a process determining unit, configured to determine an HARQ process ID of the data packet according to the downlink control information when the HARQ synchronization attribute of the data packet is configured to asynchronous HARQ.

In still another aspect, the present invention provides a system for transmitting data, including the aforesaid base station and user equipment.

In the method, apparatus, and system for transmitting data provided in the embodiments of the present invention, a base station configures an HARQ synchronization attribute of a data packet, where the HARQ synchronization attribute includes synchronous HARQ and asynchronous HARQ, and when the HARQ synchronization attribute of the data packet is configured to asynchronous HARQ, the base station configures an HARQ process ID of the data packet and sends downlink control information for scheduling the data packet to a user equipment. Therefore, in a dynamic TDD application scenario, the synchronous HARQ or asynchronous HARQ mode may be used flexibly for uplink transmission according to the current channel condition and service requirements. This avoids the problem that flexible subframes cannot be dynamically configured due to a timing relationship, so that flexible subframes are more flexibly configured as uplink or downlink subframes, thus increasing downlink throughput.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the embodiments of the present invention more clear, the following briefly describes concepts involved in an LTE TDD system first.

In an LTE TDD system, there are altogether seven types of uplink-downlink subframe configurations, as shown in Table 1, where "D" represents a downlink subframe, "U" represents an uplink frame, and "S" represents a special subframe mainly used for downlink transmission. According to Table 1, time domain resources reserved for downlink services account for 40% to 90% in the cases of various uplink-downlink subframe configurations.

TABLE 1

| Configuration ID | Repetition Cycle | Subframe ID | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| Configuration ID | Repetition Cycle | Subframe ID | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A data packet in the embodiments of the invention, preferably, is a transport block (Transport Block) carried on an uplink shared channel (UL-SCH, Uplink Shared Channel), which may be scheduled dynamically or semi-persistently. The UL-SCH is a type of transport channel (Transport Channel). It is a service that provides information transport from a physical layer to a MAC (Media Access Control, Media Access Control) layer. A data packet that is initially transmitted is referred to as an initially transmitted packet. When an error is detected in a received initially transmitted packet, the data packet needs to be retransmitted. A data packet that is retransmitted is referred to as a retransmitted packet. One HARQ process ID is configured for one data packet. That is to say, HARQ process IDs of an initially transmitted packet and a retransmitted packet corresponding to the same data packet are the same.

Figure 1:
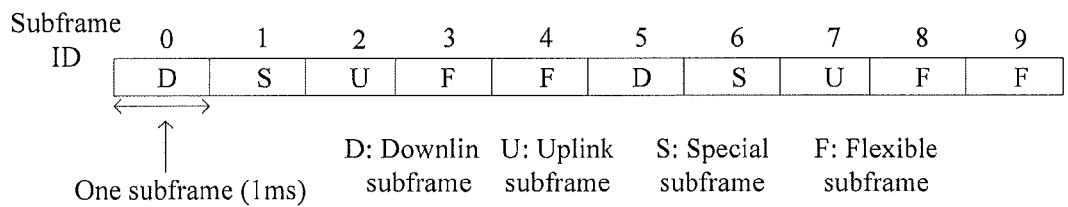
FIG. 1 is a schematic diagram of an application of a dynamic TDD subframe in a radio subframe.

In the embodiments of the present invention, a fixed subframe is a subframe whose uplink or downlink attribute cannot be changed dynamically within the valid time of each type of TDD uplink-downlink configuration, such as subframes 0, 1, 2, 5, 6, and 7 in FIG. 1. Fixed subframes include fixed uplink subframes and fixed downlink subframes, where fixed uplink subframes are subframes used for uplink transmission among fixed subframes and fixed downlink subframes are subframes used for downlink transmission among fixed subframes. A flexible subframe in the present invention is a subframe that may be dynamically or semi-statically configured as an uplink subframe or a downlink subframe within the valid time of each type of TDD uplink-downlink configuration.

Alternatively, a system notifies a user equipment in a current version (such as LTE Rel-8/9/10) of the current seven types of uplink-downlink subframe configurations through broadcast signaling. In the case of a user equipment in an evolved system (such as LTE Rel-11/12), the system may semi-statically or dynamically notify the user equipment of different uplink-downlink subframe configurations (which may be the current seven configurations or newly added uplink-downlink subframe configurations). For example, when both the current system and the evolved system notify the user equipment of the seven types of uplink-downlink subframe configurations, the current system and the evolved system may configure different subframe attributes (that is, whether a subframe is configured as an uplink subframe or a downlink subframe) for subframes 3, 4, 5, 6, 7, 8, and 9, which may therefore be regarded as flexible subframes. When both the current system and the evolved system adopt three uplink-downlink subframe configurations 0, 1, and 2, subframes 3, 4, 8, and 9 may be regarded as flexible subframes.

Therefore, configuration of flexible subframes in the present invention may be implemented simply by notifying a user equipment in an evolved system of an uplink-downlink subframe configuration.

In order to enable more flexible configuration of flexible subframes and increase downlink throughput, an embodiment of the present invention provides a method for transmitting data, including: configuring a hybrid automatic repeat request HARQ synchronization attribute of a data packet, where the HARQ synchronization attribute includes synchronous HARQ or asynchronous HARQ; configuring an HARQ process ID of the data packet when the HARQ synchronization attribute is configured to asynchronous HARQ; and sending downlink control information for scheduling the data packet to a user equipment.

Figure 2:
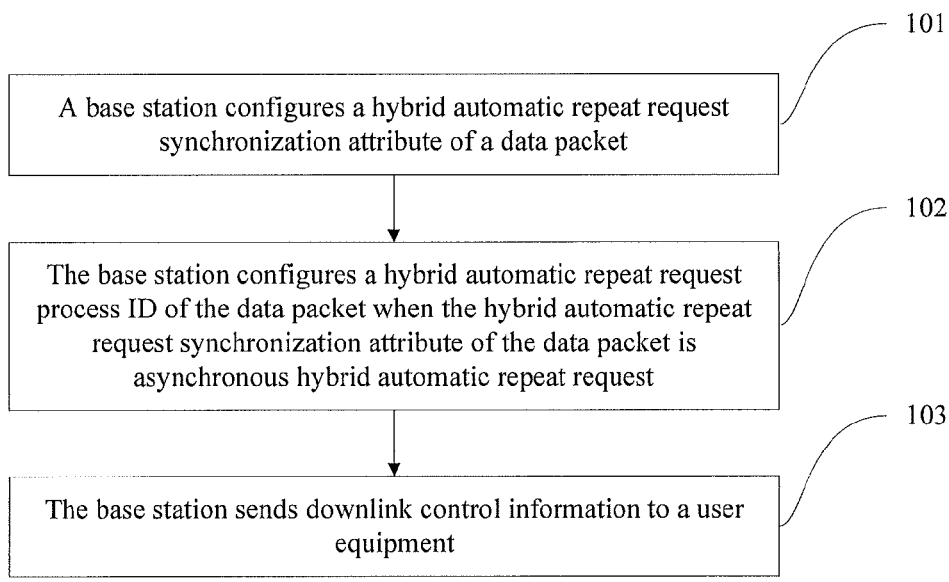
FIG. 2 is a schematic flowchart of a method for transmitting data according to an embodiment of the invention.

Specifically, as shown in FIG. 2, the method for transmitting data provided in the embodiment includes the following content.

101. A base station configures an HARQ synchronization attribute of a data packet, where the HARQ synchronization attribute includes synchronous HARQ or asynchronous HARQ.

Optionally, before the base station configures the HARQ synchronization attribute of the data packet, the base station may send a signaling notification message to a user equipment, where the signaling notification message includes flexible subframe configuration information. The flexible subframe configuration information includes subframe ID information of a flexible subframe and at least one type of information in attribute information.

For example, before the base station transports data to the user equipment, the base station needs to determine dynamic TDD subframe configuration, that is, to determine which subframes in a radio frame are flexible subframes and determine an attribute of each flexible subframe.

Optionally, the base station may determine which subframes in a radio frame are flexible subframes by using at least the following two methods:

Method 1: The subframe ID of a flexible subframe may be configured in a manner of predefinition, that is, the subframe ID of a flexible subframe in the radio frame is preset and setting information of the subframe ID of the flexible subframe is pre-configured on two sides, that is, the base station and the user equipment.

Method 2: The base station may configure the subframe ID of a flexible subframe in the radio frame according to the current channel environment, service volume, and so on. After the base station completes the configuration of the subframe ID of a flexible subframe, the base station also needs to send a signaling notification message to the user equipment, to notify the user equipment of the configured subframe ID of the flexible subframe. The signaling notification message may be carried on a downlink control channel, or carried by using high layer signaling. For example, in a specific implementation process, when the signaling notification message is carried by using high layer signaling, transmission reliability of the subframe ID of a flexible subframe may be improved.

That the base station determines the attribute of each flexible subframe is to determine whether the flexible subframe is used as an uplink subframe or is used as a downlink subframe. The base station may configure the attribute of a flexible subframe according to the current channel environment, service volume, and so on. After the base station completes the configuration of the attribute of a flexible subframe, the base station also needs to send a signaling notification message to the user equipment, to notify the user equipment of the configured attribute of the flexible subframe. The signaling notification message may be carried on a downlink control channel. The downlink control channel is a channel in a downlink control region, such as a PDCCH. In an LTE system, the downlink control region is located in the first 1-4 OFDM (Orthogonal Frequency Division Multiplexing, orthogonal frequency division multiplexing) symbols of each subframe, and is mainly used to transmit Layer 1 and/or Layer 2 physical layer signaling. In addition, the signaling notification message may also be high layer signaling.

Optionally, after determining the attribute of a flexible subframe, the base station may further determine which channels and signals need to be configured for the flexible subframe. After determining the channel and signal configuration of the flexible subframe, the base station needs to send signaling to the user equipment for notification. The content of the signaling includes which channels and signals are configured for the flexible subframe and the resource configuration of the channels and signals.

In the embodiment of the present invention, the base station needs to configure the HARQ synchronization attribute of a data packet. The HARQ synchronization attribute indicates whether the data packet is transported in a synchronous HARQ (synchronous HARQ) or asynchronous HARQ (asynchronous HARQ) mode. When the HARQ synchronization attribute of the data packet is synchronous HARQ, which means the data packet is transported in the synchronous HARQ mode, a timing sequence relationship of a retransmitted packet of the data packet relative to its initially transmitted packet is predetermined. When the HARQ synchronization attribute of the data packet is asynchronous HARQ, which means data is transported in the asynchronous HARQ mode, the timing sequence relationship of a retransmitted packet of the data packet relative to its initially transmitted packet is not fixed. Asynchronous HARQ may also be referred to as non-synchronous HARQ.

Optionally, the base station may configure the HARQ attribute of a data packet by using at least the following three methods.

Method 1: The HARQ synchronization attribute of the data packet is configured in the manner of predefinition. For example, when a data packet that is initially transmitted (that is, an initially transmitted packet) is transmitted in a fixed uplink subframe, the HARQ synchronization attribute of the data packet is preset to synchronous HARQ; when a data packet that is initially transmitted (that is, an initially transmitted packet) is transmitted in a flexible subframe that serves as an uplink subframe, the HARQ synchronization attribute of the data packet is preset to asynchronous HARQ; or, the HARQ synchronization attribute of all data packets transmitted in uplink subframes is preset to asynchronous HARQ. After the setting is complete, the setting information of the HARQ synchronization attribute of the data packet is configured on two sides, that is, the base station and the user equipment.

Method 2: The base station configures the HARQ synchronization attribute of a data packet by using high layer signaling. That is, the base station configures the HARQ synchronization attribute of the data packet according to the channel environment, service requirements, and so on, and sends a signaling message that includes the HARQ synchronization attribute of the data packet to the user equipment. For example, the base station sets the HARQ synchronization attribute of a data packet initially transmitted in a flexible subframe that serves as an uplink subframe to asynchronous HARQ, and the base station sends a signaling message to the user equipment to notify the user equipment of the setting information; or the base station sets the HARQ synchronization attribute of all data packets currently transmitted in uplink subframes to synchronous HARQ or asynchronous HARQ, and the base station sends a signaling message to the user equipment to notify the user equipment of the setting information. Relative to physical layer signaling, the high layer signaling (High Layer Signaling) is signaling sent from a higher layer (layer) at a lower frequency. The high layer signaling includes Radio Resource Control (RRC, Radio Resource Control) signaling, Media Access Control (MAC, Media Access Control) signaling, and broadcast signaling. For example, when being RRC signaling, the high layer signaling not only has relatively high reliability but can configure the HARQ synchronization attribute of data packets of each user equipment.

Method 3: The HARQ synchronization attribute of a data packet is configured through downlink control information (Downlink Control Information, DCI). The detailed configuration method is provided hereinafter.

In addition, when configuring the HARQ synchronization attribute of a data packet, the base station configures the HARQ adaptability attribute of the data packet.

The HARQ adaptability attribute means transmitting scheduling information of a retransmitted packet of the data packet in an adaptive HARQ (adaptive HARQ), semi-adaptive HARQ (semi-adaptive HARQ), or non-adaptive HARQ (non-adaptive HARQ) mode. When the HARQ adaptability attribute of the data packet is adaptive HARQ, scheduling information indicating MCS (Modulation and Coding Scheme, modulation and coding scheme), frequency domain resource allocation, and so on, of the retransmitted packet of the data packet may be reconfigured according to the channel condition. When the HARQ adaptability attribute of the data packet is non-adaptive HARQ, scheduling information indicating MCS and frequency domain resource allocation, and so on, of the retransmitted packet of the data packet is consistent with the scheduling information of the initially transmitted data packet, or changes with a predefined rule. When the HARQ adaptability attribute of the data packet is semi-adaptive HARQ, scheduling information of the retransmitted packet of the data packet is divided to two parts, that is, first scheduling information and second scheduling information. The second scheduling information indicating the retransmitted packet of the data packet is reconfigured according to the channel condition while the first scheduling information indicating the retransmitted packet of the data packet is consistent with the first scheduling information of the initially transmitted data packet, or the first scheduling information indicating the retransmitted packet of the data packet changes with a predefined rule. Optionally, the first scheduling information includes at least one item of the following scheduling information: MCS, TPC (Transmit Power Control, transmit power control), and demodulation reference signal (DMRS, Demodulation Reference Signal) cyclic shift (CS, Cyclic Shift). When semi-adaptive HARQ is used, some bits may be spared from the DCI because no bit is required to indicate the first scheduling information. For example, when the first scheduling information is MCS, only two bits of a 5-bit MCS and redundancy version (RV, Redundancy version) field may be used to notify the RV, and thereby three bits are spared. When the first scheduling information is TPC, two bits may be spared; and when the first scheduling information is DMRS CS, three bits may be spared. It should be noted that, in subsequent evolution versions, the DMRS CS field may be redefined as a DMRS cyclic shift and orthogonal cover code (OCC, orthogonal cover code) indicator field. Therefore, when the first scheduling information is a DMRS cyclic shift and OCC indicator, three bits may be spared.

For example, when the HARQ synchronization attribute of a data packet is configured to synchronous HARQ, the HARQ adaptability attribute of the data packet may be configured to adaptive HARQ or non-adaptive HARQ. In this case, the base station may configure the HARQ adaptability attribute of the data packet to adaptive HARQ or non-adaptive HARQ as required. For example, when the base station configures the HARQ adaptability attribute of a data packet to adaptive HARQ as required, the base station may send a PDCCH indicating retransmission of the data packet to the user equipment at a preset time, to notify the user equipment that the HARQ adaptability attribute of the data packet is adaptive HARQ. When the base station configures the HARQ adaptability attribute of a data packet to non-adaptive HARQ as required, the base station may not send a PDCCH indicating retransmission of the data packet to the user equipment at a preset time, to let the user equipment obtain that the HARQ adaptability attribute of the data packet is non-adaptive HARQ.

When the HARQ synchronization attribute of a data packet is configured to asynchronous HARQ, the HARQ adaptability attribute of the data packet may be configured to adaptive HARQ or semi-adaptive HARQ. In this case, the base station may configure the HARQ adaptability attribute of the data packet to adaptive HARQ or semi-adaptive HARQ as required. The base station may send a DCI indicating retransmission of the data packet to the user equipment, to let the user equipment obtain the HARQ process ID of the retransmitted data packet.

102. When the HARQ synchronization attribute of the data packet is configured to asynchronous HARQ, the base station configures the HARQ process ID of the data packet.

When configuring the HARQ synchronization attribute of the data packet to asynchronous HARQ, the base station needs to configure the HARQ process ID of the data packet. In addition, in a dynamic TDD subframe configuration scenario, because a flexible subframe may be configured as an uplink subframe, the number of HARQ processes (Number of HARQ processes) needs to be raised before the HARQ process ID is configured. Specifically, the number of added HARQ processes may be configured in at least the following two manners.

Manner 1: The number of added HARQ processes is configured in the manner of predefinition. The corresponding number of added HARQ processes may be preset according to different uplink-downlink subframe configurations. For example, it may be configured that no HARQ process is added when the uplink-downlink configuration is 0, two HARQ processes are added when the uplink-downlink configuration is 1, and four HARQ processes are added when the uplink-downlink configuration is 2. Alternatively, the number of added HARQ processes may be configured according to the number of flexible subframes in each radio frame. For example, if there are four flexible subframes in each radio frame, it is configured that four HARQ processes are added.

Manner 2: The base station determines the number of added HARQ processes and notifies the user equipment of the determined number of added HARQ processes by using signaling. For example, the base station uses high layer signaling to notify the user equipment of the number of added HARQ processes, so that transmission of the number of added HARQ processes is reliable.

After the configuration of the number of added HARQ processes is complete, the HARQ process ID of the data packet is configured. The HARQ process ID of the initially transmitted packet of the data packet and that of its retransmitted packet may be identical or different. The HARQ process ID of the initially transmitted packet of the data packet may be configured by using at least the following two methods.

Method 1

The HARQ process ID of the initially transmitted packet of the data packet is configured in the manner of predefinition. For example, when the HARQ synchronization attribute of all data packets initially transmitted in uplink subframes is asynchronous HARQ, a mapping relationship, such as a one-to-one mapping relationship, is preset between HARQ process IDs of initially transmitted packets of data packets and subframe IDs of uplink subframes. For example, assuming that a radio frame in a format shown in FIG. 1 is used to transport data and the HARQ process IDs of data packets initially transmitted in subframes 2, 3, 4, 7, 8, and 9 are respectively preset to 0, 1, 2, 3, 4, and 5. In this case, when an initially transmitted data packet scheduled by the DCI is transmitted in flexible subframe 8, the HARQ process ID of the data packet is 4.

Alternatively, when the HARQ synchronization attribute of a data packet initially transmitted in a flexible subframe that serves as an uplink subframe is asynchronous HARQ, and the HARQ synchronization attribute of a data packet initially transmitted in a fixed uplink subframe is synchronous HARQ, a mapping relationship, such as a one-to-one mapping relationship, is preset between HARQ process IDs of initially transmitted data packets and subframe IDs of flexible subframes. For example, assuming that a radio frame in a format shown in FIG. 1 is used to transport data and the HARQ process IDs of data packets initially transmitted in flexible subframes 3, 4, 8, and 9 are respectively preset to 0, 1, 2, and 3. In this case, when an initially transmitted data packet scheduled by the DCI is transmitted in flexible subframe 8, the HARQ process ID of the data packet is 2.

The method 1 requires no added DCI bit to indicate the HARQ process ID of the initially transmitted packet of a data packet, and thereby saves the overhead of the DCI.

Method 2

According to the number of HARQ processes that needs to be set, the base station adds a certain number of bits in the DCI sent to the user equipment to indicate the HARQ process ID of the initially transmitted packet of a data packet. For example, when the HARQ synchronization attribute of all data packets initially transmitted in uplink subframes is asynchronous HARQ, three bits are added in the DCI sent to the user equipment to indicate the HARQ process ID of the initially transmitted packet of the data packet. Alternatively, when the HARQ synchronization attribute of data packets initially transmitted in only flexible subframes that serve as uplink subframes is asynchronous HARQ, two bits are added in the DCI sent to the user equipment to indicate the HARQ process ID of the initially transmitted packet of the data packet. With method 2 applied to indicate the HARQ process ID of the initially transmitted packet of a data packet, transmission of the initially transmitted packet of a data packet is more flexible.

In the embodiment of the present invention, the method where the HARQ process ID of the initially transmitted packet of a data packet is configured in the manner of predefinition may be referred to as an implicit method for indicating an HARQ process ID of an initially transmitted packet, and the method where the HARQ process ID of the initially transmitted packet of a data packet is configured through DCI may be referred to as an explicit method for indicating an HARQ process ID of an initially transmitted packet.

The explicit method for indicating an HARQ process ID is used to configure the HARQ process ID of the initially transmitted packet of a data packet. The number of bits that indicate an HARQ process ID may be determined according to the number of processes supported by asynchronous HARQ. For example, when a system supports four asynchronous HARQ processes, two DCI bits are required to indicate the HARQ process ID of the initially transmitted packet of the data packet. When the HARQ adaptability attribute of a retransmitted packet of the data packet is adaptive HARQ, a certain number of bits are added in the DCI sent to the user equipment to indicate the HARQ process ID of the retransmitted packet of the data packet. In addition, when the HARQ adaptability attribute of a retransmitted packet of the data packet is semi-adaptive HARQ, no DCI bit needs to be added while an idle bit in the DCI is used to indicate the HARQ process ID of the retransmitted packet of the data packet. That is, a DCI bit in the first scheduling information field is used to indicate the HARQ process ID of the retransmitted packet of the data packet (in the case of semi-adaptive HARQ, the first scheduling information in the DCI indicating a retransmitted packet of the data packet does not need to be notified, and therefore there are idle bits).

103. The base station sends downlink control information for scheduling the data packet to the user equipment.

The base station may send the downlink control information of the data packet to the user equipment according to the HARQ synchronization attribute and HARQ adaptability attribute of the data packet, or according to the HARQ synchronization attribute, HARQ adaptability attribute, and HARQ process ID of the data packet. In a specific implementation process, before receiving or sending service data, the user equipment may receive the DCI configured by the base station for the user equipment through a PDCCH, so as to obtain scheduling information of the data packet. In the embodiment, the DCI is used to indicate not only the scheduling information of the data packet but also the HARQ process ID of the data packet. In addition, when the system supports both synchronous HARQ and asynchronous HARQ, it needs to be distinguished whether synchronous HARQ or asynchronous HARQ is used for the data packet indicated by the current DCI. Therefore, the DCI may also indicate the HARQ synchronization attribute of the data packet.

The following describes two types of asynchronous HARQ data packet configurations in detail. In one configuration, specifically, the initially transmitted packet of a data packet uses implicit indication of the HARQ process ID and the retransmitted packet of the data packet uses semi-adaptive HARQ (referred to as Configuration 1 hereinafter). In the other configuration, the initially transmitted packet of a data packet uses explicit indication of the HARQ process ID and the retransmitted packet of the data packet uses adaptive HARQ (referred to as Configuration 2 hereinafter). The following describes DCI sent by a base station to a user equipment in detail with regard to the two configurations.

Configuration 1

In Configuration 1, the initially transmitted packet of the data packet uses implicit indication of the HARQ process ID, that is, a mapping relationship is predefined between HARQ process IDs of initially transmitted packets of data packets and subframe IDs of uplink subframes or flexible subframes and therefore, the HARQ process ID of the data packet may be determined according to the subframe ID of the uplink subframe that carries the initially transmitted packet of the data packet. The retransmitted packet of the data packet uses semi-adaptive HARQ, therefore an idle bit in the DCI indicating retransmission of the data packet may be used to indicate the HARQ process ID of the data packet.

Therefore, in Configuration 1, no DCI bit needs to be added in the DCI indicating either initial transmission or retransmission of the data packet to indicate the process ID.

In a scenario with Configuration 1, a downlink assignment index (DAI, Downlink Assignment Index) field in the DCI may be used to indicate the HARQ synchronization attribute of the data packet. In this case, no DCI bit needs to be added to indicate the HARQ synchronization attribute of the data packet. Alternatively, a certain number of bits, or attribute indicator bits, may be added in the DCI, to indicate the HARQ synchronization attribute of the data packet.

When the DAI field of the DCI is used to indicate the HARQ synchronization attribute of the data packet, the DAI field consists of two bits. The DAI may be used to indicate the HARQ synchronization attribute of the data packet by using at least the following four methods.

Method 1: One bit in the DAI field is used to indicate the HARQ synchronization attribute of the data packet. For example, when the bit indicating the HARQ synchronization attribute of the data packet is "0", it indicates that the scheduled data packet uses synchronous HARQ; when the bit indicating the HARQ synchronization attribute of the data packet is "1", it indicates that the scheduled data packet uses asynchronous HARQ.

Method 2: One bit in the DAI field is used to indicate whether a synchronous HARQ data packet is scheduled and the other bit in the DAI field is used to indicate whether an asynchronous HARQ data packet is scheduled. For example, a most significant bit (MSB, Most Significant Bit) in the DAI field is used to indicate scheduling of a synchronous HARQ data packet, and a least significant bit (LSB, Least Significant Bit) in the DAI field is used to indicate scheduling of an asynchronous HARQ data packet. Therefore, when the value of the MSB is "1", it indicates that a synchronous HARQ data packet is scheduled; otherwise, it indicates that no synchronous HARQ data packet is scheduled. When the value of the LSB is "1", it indicates that an asynchronous HARQ data packet is scheduled; otherwise, it indicates that no asynchronous HARQ data packet is scheduled. When the values of the MSB and the LSB are both "1", it indicates that a synchronous HARQ data packet and an asynchronous HARQ data packet are scheduled. With method 2 applied, one DCI can schedule synchronous HARQ and asynchronous HARQ data packets simultaneously, which saves the overhead of the DCI. It should be noted that a synchronous HARQ data packet and an asynchronous HARQ data packet scheduled simultaneously are transmitted in different subframes.

Method 3: One state of the bits in the DAI field is used to indicate that the scheduled data packet uses synchronous HARQ, and another state of the bits in the DAI field is used to indicate that the scheduled data packet uses asynchronous HARQ. For example, when the bits in the DAI field are "00", it indicates that the scheduled data packet uses synchronous HARQ, and when the bits in the DAI field are "11", it indicates that the scheduled data packet uses asynchronous HARQ.

Method 4: N (an integer above 0 and below 4) states of the DAI field are used to indicate that the scheduled data packet uses synchronous HARQ, and the remaining (4-N states are used to indicate that the scheduled data packet uses asynchronous HARQ. In addition, different states in the remaining (4-N) states may be used to indicate how many asynchronous HARQ data packet are scheduled. For example, supposing N=1, when the state of the DAI field is "00", it indicates that the scheduled data packet uses synchronous HARQ, and the remaining (4-N) states of the DAI field ("01", "10", and "11") indicate that the scheduled data packet uses asynchronous HARQ. When the state of the DAI field is "01", it indicates that one asynchronous HARQ data packet is scheduled; when the state of the DAI field is "10", it indicates that two asynchronous HARQ data packets are scheduled; when the state of the DAI field is "11", it indicates that three asynchronous HARQ data packets are scheduled. Alternatively, different states in the remaining (4-N) states may be used to indicate asynchronous HARQ data packets in which subframes are scheduled. For example, supposing N=1, when the state of the DAI field is "00", it indicates that the scheduled data packet uses synchronous HARQ, and the remaining (4-N) states of the DAI field ("01", "10", and "11") indicate that the scheduled data packet uses asynchronous HARQ. When the state of the DAI field is "01", it indicates that an asynchronous HARQ data packet in subframe n+k is scheduled; when the state of the DAI field is "10", it indicates that an asynchronous HARQ data packet in subframe n+k+m is scheduled; when the state of the DAI field is "11", it indicates that asynchronous HARQ data packets in subframe n+k and subframe n+k+m are scheduled. n indicates that the DCI is transmitted in downlink subframe n; k and m are predefined subframe offsets.

Configuration 2

In Configuration 2, an initially transmitted packet of a data packet uses explicit indication of the HARQ process ID and a retransmitted packet of the data packet uses adaptive HARQ. Therefore, a DCI indicating initial transmission of the data packet and that indicating retransmission of the data packet both require added DCI bits to indicate the HARQ process ID. In a specific implementation process, in order not to increase times of blind detection of the PDCCH, the number of bits in a DCI indicating a synchronous HARQ data packet may be the same as the number of bits in a DCI indicating an asynchronous HARQ data packet. Therefore, if a certain number of bits are added in the DCI indicating an asynchronous HARQ data packet to indicate the HARQ process ID of the data packet, the same number of bits may be added in the DCI indicating a synchronous HARQ data packet.

The DAI may be used to indicate the HARQ synchronization attribute of a data packet in at least the following three manners.

Manner 1: The DAI field in the DCI is used to indicate the HARQ synchronization attribute of the data packet. For the specific method of using the DAI to indicate the HARQ synchronization attribute of the data packet, reference may be made to related descriptions of Configuration 1 and will not be repeated here.

Manner 2: A certain number of bits, that is, attribute indicator bits, may be added in the DCI, to indicate the HARQ synchronization attribute of the data packet.

Manner 3: A state of the bits indicating the HARQ process ID of the data packet may be used to indicate the HARQ synchronization attribute of the data packet. The bits indicating the HARQ process ID of the data packet are hereby referred to as attribute process indicator bits. For example, assuming that two bits are added in the DCI as attribute process indicator bits, when the state of the attribute process indicator bits is "00", it indicates that the scheduled data packet uses synchronous HARQ, while the other states ("01", "10", and "11") of the attribute process indicator bits indicate that the schedule data packet uses asynchronous HARQ. The specific values of the other states of the attribute process indicator bits indicate different HARQ process IDs. For example, when the attribute process indicator bits are "01", it indicates that the HARQ process ID of the data packet is 1; when the attribute process indicator bits are "10", it indicates that the HARQ process ID of the data packet is 2; when the attribute process indicator bits are "11", it indicates that the HARQ process ID of the data packet is 3.

In addition, the DCI indicating an asynchronous HARQ data packet, and the asynchronous HARQ data packet, need to be transmitted according to a certain timing sequence relationship. For example, a format of a radio frame where a data packet is transmitted is shown in FIG. 1. A DCI transmitted in subframe 0 is used to schedule a data packet in subframe 4; a DCI transmitted in subframe 1 is used to schedule a data packet in subframe 8; a DCI transmitted in subframe 5 is used to schedule a data packet in subframe 9; a DCI transmitted in subframe 6 is used to schedule a data packet in subframe 3 of a next radio frame.

In addition, transmission of an asynchronous HARQ data packet and ACK/NACK feedback of the asynchronous HARQ data packet may also be performed according to a certain timing sequence relationship. For example, a data packet in subframe 3 corresponds to ACK/NACK feedback in subframe 0 of a next radio frame; a data packet in subframe 4 corresponds to ACK/NACK feedback in subframe 1 of the next radio frame; a data packet in subframe 8 corresponds to ACK/NACK feedback in subframe 5 of the next radio frame; a data packet in subframe 9 corresponds to ACK/NACK feedback in subframe 6 of the next radio frame.

The timing sequence relationship may be defined by the system and is not limited to the timing sequence relationships listed above.

In the method for transmitting data provided in the embodiment of the present invention, the base station configures the HARQ synchronization attribute of a data packet, where the HARQ synchronization attribute includes synchronous HARQ and asynchronous HARQ, and when the HARQ synchronization attribute of the data packet is configured to asynchronous HARQ, the base station configures the HARQ process ID of the data packet and sends the downlink control information corresponding to the data packet to the user equipment. Therefore, in a dynamic TDD application scenario, the synchronous HARQ or asynchronous HARQ mode may be used flexibly for uplink transmission according to the current channel condition, service requirements, and so on. This avoids the problem that flexible subframes cannot be dynamically configured due to the timing relationship, so that flexible subframes are more flexibly configured as uplink or downlink subframes, thus increasing downlink throughput.

Figure 3:
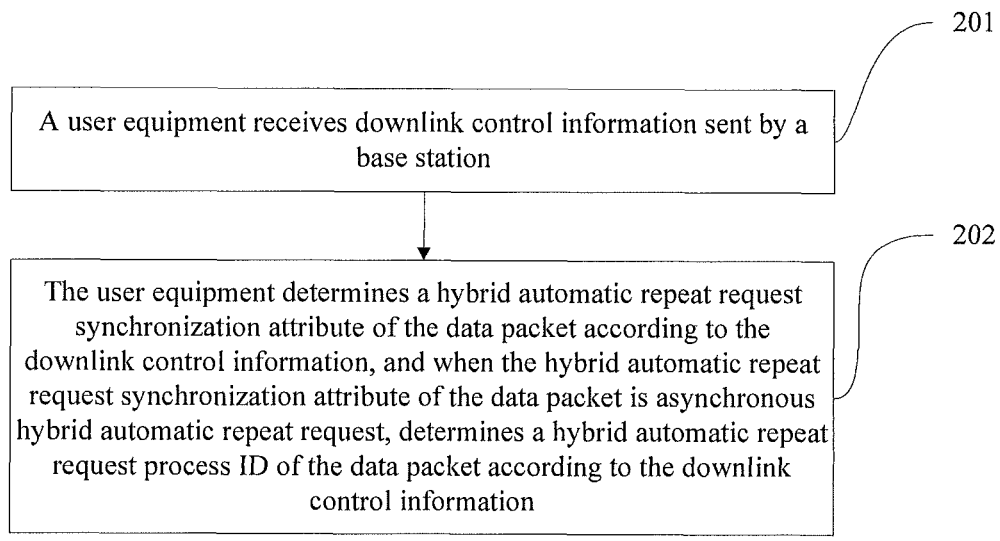
FIG. 3 is a schematic flowchart of another method for transmitting data according to an embodiment of the invention.

Corresponding to the aforesaid method, an embodiment of the present invention provides a method for transmitting data. As shown in FIG. 3, the method includes the following content.

201. A user equipment receives downlink control information sent by a base station for scheduling a data packet.

For example, before the user equipment receives the downlink control information of a data packet, which is sent by the base station, the user equipment may receive a signaling notification message sent by the base station, where the signaling notification message carries flexible subframe configuration information. The flexible subframe configuration information includes subframe ID information of a flexible subframe and at least one type of information in attribute information. The user equipment determines a flexible subframe configuration according to the flexible subframe configuration information.

For example, before the user equipment receives the downlink control information of a data packet, which is sent by the base station, the user equipment may receive a signaling notification message sent by the base station, where the signaling content includes which channels and signals are configured for the flexible subframe and the resource configuration of the channels and signals.

202. The user equipment determines an HARQ synchronization attribute of the data packet according to the downlink control information. The HARQ synchronization attribute includes synchronous HARQ or asynchronous HARQ. When the HARQ synchronization attribute of the data packet is configured to asynchronous HARQ, the user equipment determines an HARQ process ID of the data packet according to the downlink control information.

In the embodiment, when determining the HARQ synchronization attribute of the data packet according to the downlink control information, the user equipment may also determine an HARQ adaptability attribute of the data packet according to the downlink control information. The HARQ adaptability attribute includes: adaptive HARQ, non-adaptive HARQ, or semi-adaptive HARQ.

For example, the HARQ synchronization attribute of the data packet may be determined in at least the following manners.

When the initially transmitted packet of the data packet is transmitted in a fixed uplink subframe, the HARQ synchronization attribute of the data packet is preset to synchronous HARQ; when the initially transmitted packet of the data packet is transmitted in a flexible subframe that serves as an uplink subframe, the HARQ synchronization attribute of the data packet is preset to asynchronous HARQ.

Alternatively, the HARQ synchronization attribute of all data packets transmitted in uplink subframes is determined to be asynchronous HARQ according to preset information.

Alternatively, the user equipment receives signaling sent by the base station, where the signaling carries the HARQ synchronization attribute of the data packet. The signaling includes radio resource control signaling or downlink control information. When the signaling is downlink control information, the HARQ synchronization attribute of the data packet may be determined according to a downlink assignment index field in the downlink control information.

For example, the HARQ adaptability attribute of the data packet may be determined in at least the following manners:

When the HARQ synchronization attribute of the data packet is configured to synchronous HARQ, the HARQ adaptability attribute of the data packet may be configured to adaptive HARQ or non-adaptive HARQ. For example, when the user equipment receives a PDCCH indicating retransmission of the data packet at a corresponding time, the HARQ adaptability attribute of the data packet is adaptive HARQ. When the user equipment receives no PDCCH indicating retransmission of the data packet at a corresponding moment, the HARQ adaptability attribute of the data packet is non-adaptive HARQ.

When the HARQ synchronization attribute of a data packet is configured to asynchronous HARQ, the HARQ adaptability attribute of the data packet may be configured to adaptive HARQ or semi-adaptive HARQ. In this case, the user equipment may receive a DCI indicating retransmission of the data packet. There are two exemplary configurations. In one configuration, specifically, the initially transmitted packet of a data packet uses implicit indication of the HARQ process ID and a retransmitted packet of the data packet uses semi-adaptive HARQ. In the other configuration, the initially transmitted packet of a data packet uses explicit indication of the HARQ process ID and a retransmitted packet of the data packet uses adaptive HARQ.

In addition, configuration methods of the HARQ process IDs of the initially transmitted packet and the retransmitted packet of the data packet may be different. For the specific methods, reference may be made to operations on the base station side in the embodiment shown in FIG. 2. For example, an HARQ process ID of a data packet may be determined in at least the following manners.

After the downlink control information is received, if a mapping relationship is preset between HARQ process IDs of initially transmitted packets of data packets and subframe IDs of uplink subframes, the HARQ process ID of the data packet is determined according to the mapping relationship.

Alternatively, after the downlink control information is received, if a mapping relationship is preset between HARQ process IDs of initially transmitted packets of data packets and subframe IDs of flexible subframes, the HARQ process ID of the data packet is determined according to the mapping relationship.

Alternatively, after the downlink control information is received, if the HARQ adaptability attribute of the data packet is determined to be semi-adaptive HARQ, the HARQ process ID of the data packet is determined according to an idle bit of the downlink control information.

Alternatively, after the downlink control information is received, if the HARQ adaptability attribute of the data packet is determined to be adaptive HARQ, an added DCI bit is used to indicate the HARQ process ID of the data packet.

In a specific implementation process, the mapping relationship between HARQ process IDs of initially transmitted data packets and subframe IDs of uplink subframes and the mapping relationship between HARQ process IDs of initially transmitted data packets and subframe IDs of flexible subframes may be one-to-one mapping relationships.

It should be noted that, because the method procedure on the user equipment side is relevant to the method procedure on the base station side, where the base station is a signaling transmit end and the user equipment is a signaling receive end, for mechanisms such as determination of the HARQ synchronization attribute of the data packet, determination of the HARQ adaptability attribute, and determination of the HARQ process ID, reference may be made to description of the method on the base station side in the embodiment shown in FIG. 2.

In the method for transmitting data provided in the embodiment, the user equipment receives downlink control information corresponding to a data packet sent by the base station and determines the HARQ synchronization attribute of the data packet according to the downlink control information. When the HARQ synchronization attribute of the data packet is configured to asynchronous HARQ, the user equipment determines the HARQ process ID of the data packet according to the downlink control information. Therefore, in a dynamic TDD application scenario, the synchronous HARQ or asynchronous HARQ mode may be used flexibly for uplink transmission according to the current channel condition, service requirements, and so on. This avoids the problem that flexible subframes cannot be dynamically configured due to the timing relationship, so that flexible subframes are more flexibly configured as uplink or downlink subframes, thus increasing downlink throughput.

Figure 4:
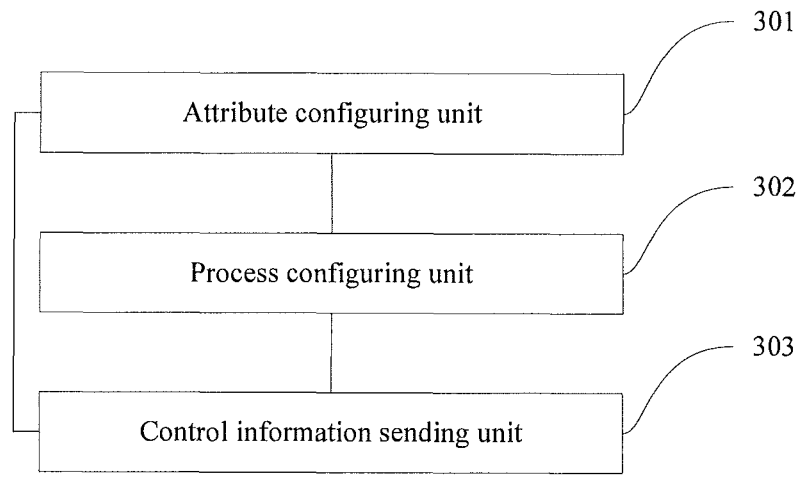
FIG. 4 is a schematic structural diagram of a base station according to an embodiment of the invention.

Corresponding to the aforesaid methods, an embodiment of the present invention provides a base station. As shown in FIG. 4, the base station includes: an attribute configuring unit 301, a process configuring unit 302, and a control information sending unit 303.

The attribute configuring unit 301 configures an HARQ synchronization attribute of a data packet, where the HARQ synchronization attribute includes synchronous HARQ or asynchronous HARQ; the process configuring unit 302 configures an HARQ process ID of the data packet when the HARQ synchronization attribute of the data packet is configured to asynchronous HARQ; the control information sending unit 303 sends downlink control information for scheduling the data packet to a user equipment.

Optionally, the base station further includes a notification message sending unit, configured to send flexible subframe configuration information to the user equipment, where the flexible subframe configuration information includes subframe ID information of a flexible subframe and at least one type of information in attribute information.

Further, the attribute configuring unit 301 is specifically configured to preset the HARQ synchronization attribute of the data packet to synchronous HARQ when an initially transmitted packet of the data packet is transmitted in a fixed uplink subframe, and preset the HARQ synchronization attribute of the data packet to asynchronous HARQ when an initially transmitted packet of the data packet is transmitted in a flexible subframe that serves as an uplink subframe; or preset the HARQ synchronization attribute of the data packet to asynchronous HARQ in all circumstances.

Further, the attribute configuring unit 301 includes an information sending subunit, configured to send signaling to the user equipment, where the signaling carries the HARQ synchronization attribute of the data packet and the signaling includes radio resource control signaling or downlink control information.

Further, the attribute configuring unit 301 is configured to configure an HARQ adaptability attribute of the data packet, where the HARQ adaptability attribute includes adaptive HARQ, non-adaptive HARQ, or semi-adaptive HARQ; further, the attribute configuring unit 301 is specifically configured to configure the HARQ adaptability attribute of the data packet to adaptive HARQ or non-adaptive HARQ when the HARQ synchronization attribute of the data packet is configured to synchronous HARQ; and configure the HARQ adaptability attribute of the data packet to adaptive HARQ or semi-adaptive HARQ when the HARQ synchronization attribute of the data packet is configured to asynchronous HARQ.

Further, the process configuring unit 302 includes a process number configuring subunit, configured to preset the numbers of added HARQ processes corresponding to different uplink-downlink subframe configurations, or determine the number of added HARQ processes according to the number of flexible subframes; or notify the user equipment of the number of added HARQ processes by using high layer signaling.

Further, the process configuring unit 302 further includes a process ID configuring subunit, configured to preset a mapping relationship, such as a one-to-one mapping relationship, between HARQ process IDs of initially transmitted packets of data packets and subframe IDs of uplink subframes; or preset a mapping relationship, such as a one-to-one mapping relationship, between HARQ process IDs of initially transmitted packets of data packets and subframe IDs of flexible subframes; or indicate the HARQ process ID of the initially transmitted packet of the data packet by using downlink control information.

Further, the attribute configuring unit 301 is specifically configured to configure the HARQ adaptability attribute of a retransmitted packet of the data packet to semi-adaptive HARQ when a mapping relationship is preset between HARQ process IDs of initially transmitted packets of data packets and subframe IDs of uplink subframes or a mapping relationship is preset between HARQ process IDs of initially transmitted packets of data packets and subframe IDs of flexible subframes; or configure the HARQ adaptability attribute of a retransmitted packet of the data packet to semi-adaptive HARQ when the HARQ process ID of the initially transmitted packet of the data packet is indicated by using downlink control information.

Further, the control information sending unit 303 is specifically configured to send downlink control information for scheduling the data packet to the user equipment, where one bit in a downlink assignment index field in the downlink control information is used to indicate the HARQ synchronization attribute of the data packet; or one state of the downlink assignment index field in the downlink control information is used to indicate that the scheduled data packet uses synchronous HARQ and another state is used to indicate that the scheduled data packet uses asynchronous HARQ; or N (an integer above 0 and below 4) states of the downlink assignment index field in the downlink control information are used to indicate that the scheduled data packet uses synchronous HARQ, and the remaining (4-N) states are used to indicate that the scheduled data packet uses asynchronous HARQ; or N (an integer above 0 and below 4) states of the downlink assignment index field in the downlink control information are used to indicate that the scheduled data packet uses synchronous HARQ, and the remaining (4-N) states are used to indicate that the scheduled data packet uses asynchronous HARQ, where different states of the remaining (4-N) states indicate subframe IDs of subframes where the scheduled data packet that uses asynchronous HARQ resides.

The base station provided in the embodiment of the present invention configures the HARQ synchronization attribute of a data packet, where the HARQ synchronization attribute includes synchronous HARQ and asynchronous HARQ, and when the HARQ synchronization attribute of the data packet is configured to asynchronous HARQ, the base station configures the HARQ process ID of the data packet and sends the downlink control information for scheduling the data packet to the user equipment. Therefore, in a dynamic TDD application scenario, the synchronous HARQ or asynchronous HARQ mode may be used flexibly for uplink transmission according to the current channel condition, service requirements, and so on. This avoids the problem that flexible subframes cannot be dynamically configured due to the timing relationship, so that flexible subframes are more flexibly configured as uplink or downlink subframes, thus increasing downlink throughput.

Figure 5:
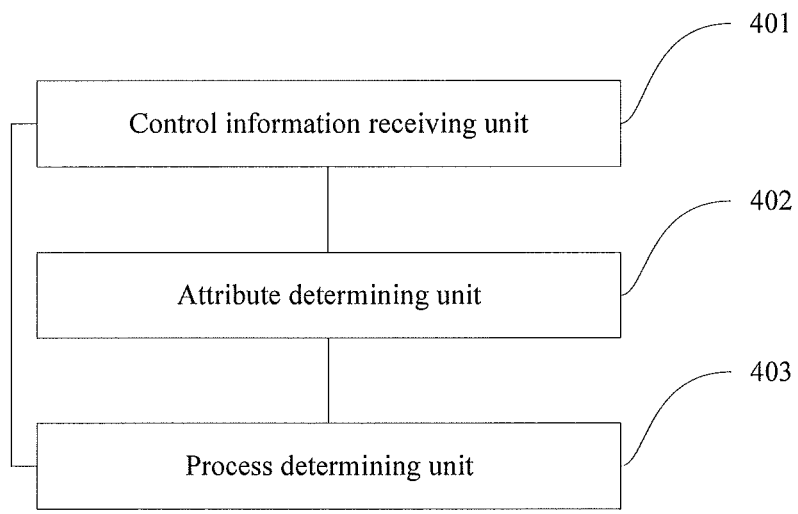
FIG. 5 is a schematic structural diagram of a user equipment according to an embodiment of the invention.

Corresponding to the preceding apparatus, an embodiment of the present invention provides a user equipment that can implement the method embodiment shown in FIG. 3. As shown in FIG. 5, the user equipment includes a control information receiving unit 401, an attribute determining unit 402, and a process determining unit 403.

The control information receiving unit 401 receives downlink control information sent by a base station for scheduling a data packet; the attribute determining unit 402 determines an HARQ synchronization attribute of the data packet according to the downlink control information, where the HARQ synchronization attribute includes synchronous HARQ or asynchronous HARQ; and the process determining unit 403 determines an HARQ process ID of the data packet according to the downlink control information when the HARQ synchronization attribute of the data packet is configured to asynchronous HARQ.

Optionally, the user equipment further includes a notification message receiving unit and a subframe configuration determining unit. The notification message receiving unit receives flexible subframe configuration information sent by the base station, where the subframe configuration information includes subframe ID information of a flexible subframe and at least one type of information in attribute information of the flexible subframe; and the subframe configuration determining unit determines a flexible subframe configuration according to the flexible subframe configuration information.

Further, the attribute determining unit 402 is specifically configured to preset the HARQ synchronization attribute of the data packet to synchronous HARQ when an initially transmitted packet of the data packet is transmitted in a fixed uplink subframe, and preset the HARQ synchronization attribute of the data packet to asynchronous HARQ when an initially transmitted packet of the data packet is transmitted in a flexible subframe that serves as an uplink subframe; or preset the HARQ synchronization attribute of the data packet to asynchronous HARQ in all circumstances; or determine the HARQ synchronization attribute of the data packet according to a downlink assignment index field in the downlink control information.

Optionally, the user equipment further includes a signaling receiving unit, configured to receive the radio resource control signaling sent by the base station, where the radio resource control signaling carries the HARQ synchronization attribute of the data packet; and the attribute determining unit 402 is specifically configured to determine the HARQ synchronization attribute of the data packet according to the downlink control information and the radio resource control signaling.

Further, the attribute determining unit 402 is configured to determine the HARQ adaptability attribute of the data packet, where the HARQ adaptability attribute includes adaptive HARQ, non-adaptive HARQ, or semi-adaptive HARQ.

The process determining unit 403 is specifically configured to, after the downlink control information is received, if a mapping relationship, such as one-to-one mapping relationship, is preset between HARQ process IDs of initially transmitted packets of data packets and subframe IDs of uplink subframes, determine the HARQ process ID of the data packet according to the mapping relationship; or, if a mapping relationship, such as one-to-one mapping relationship, is preset between HARQ process IDs of initially transmitted packets of data packets and subframe IDs of flexible subframes, determine the HARQ process ID of the data packet according to the mapping relationship; or, if the HARQ adaptability attribute of a retransmitted packet of the data packet is determined to be semi-adaptive HARQ, determine the HARQ process ID of the data packet according to an idle bit of the downlink control information.

The user equipment provided in the embodiment receives the downlink control information corresponding to a data packet sent by the base station and determines the HARQ synchronization attribute of the data packet according to the downlink control information. When the HARQ synchronization attribute of the data packet is configured to asynchronous HARQ, the user equipment determines the HARQ process ID of the data packet according to the downlink control information. Therefore, in a dynamic TDD application scenario, the synchronous HARQ or asynchronous HARQ mode may be used flexibly for uplink transmission according to the current channel condition, service requirements. This avoids the problem that flexible subframes cannot be dynamically configured due to the timing relationship, so that flexible subframes are more flexibly configured as uplink or downlink subframes, thus increasing downlink throughput.

Figure 6:
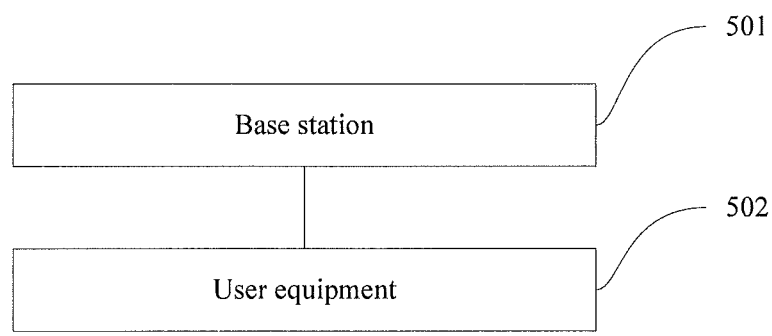
FIG. 6 is a schematic structural diagram of a system for transmitting data according to an embodiment of the invention.

Corresponding to the aforesaid methods and apparatuses, an embodiment of the present invention provides a system for transmitting data. As shown in FIG. 6, the system includes a base station 501 and a user equipment 502.

The base station 501 configures an HARQ synchronization attribute of a data packet, where the HARQ synchronization attribute includes synchronous HARQ or asynchronous HARQ; configures an HARQ process ID of the data packet when the HARQ synchronization attribute of the data packet is configured to asynchronous HARQ; and sends downlink control information for scheduling the data packet to the user equipment 502. The user equipment 502 receives the downlink control information sent by the base station for scheduling the data packet; determines the HARQ synchronization attribute of the data packet according to the downlink control information; and determines an HARQ process ID of the data packet according to the downlink control information when the HARQ synchronization attribute of the data packet is configured to asynchronous HARQ.

For specific structures and functions of the base station 501 and the user equipment 502, reference may be made to the embodiments shown in FIG. 4 and FIG. 5, which will not be repeated here.

In the system for transmitting data provided in the embodiment of the present invention, the base station configures the HARQ synchronization attribute of a data packet, where the HARQ synchronization attribute includes synchronous HARQ and asynchronous HARQ, and when the HARQ synchronization attribute of the data packet is configured to asynchronous HARQ, the base station configures the HARQ process ID of the data packet and sends the downlink control information for scheduling the data packet to the user equipment. Therefore, in a dynamic TDD application scenario, synchronous HARQ or asynchronous HARQ may be used flexibly for uplink transmission according to the current channel condition, service requirements, and so on. This avoids the problem that flexible subframes cannot be dynamically configured due to the timing relationship, so that flexible subframes are more flexibly configured as uplink or downlink subframes, thus increasing downlink throughput.

A person of ordinary skill in the art may understand that all or a part of the processes of the methods in the embodiments may be implemented by a computer program instructing relevant hardware. The program may be stored in a computer readable storage medium. When the program runs, the processes of the foregoing methods in the embodiments are performed. The storage medium may be a magnetic disk, an optical disc, a read-only memory (Read-Only Memory, ROM), or a random access memory (Read-Only Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting data, comprising:
   configuring a hybrid automatic repeat request HARQ synchronization attribute of a data packet, wherein the HARQ synchronization attribute comprises synchronous HARQ or asynchronous HARQ, and the data packet is a transport block carried on an uplink shared channel;
   configuring a HARQ process ID of the data packet when the HARQ synchronization attribute of the data packet is configured to be asynchronous HARQ; and
   sending downlink control information for scheduling the data packet to a user equipment, wherein the downlink control information indicates the HARQ synchronization attribute and the HARQ process ID,
   wherein the downlink control information includes a bit indicating the HARQ process ID, and wherein the bit also indicates the HARQ synchronization attribute, and
   wherein a first state of the bit indicates the HARQ process ID of the data packet, which indicates that the scheduled data packet uses synchronous HARQ, and a second state of the bit indicates the HARQ process ID of the data packet, which indicates that the schedule data packet uses asynchronous HARQ.

2. The method for transmitting data according to claim 1, further comprising:
   notifying the user equipment of a number of HARQ processes that were added by using high layer signaling.

3. The method for transmitting data according to claim 1, further comprising:
   configuring a HARQ adaptability attribute of the data packet to adaptive HARQ or semi-adaptive HARQ when the HARQ synchronization attribute of the data packet is configured to be asynchronous HARQ.

4. The method for transmitting data according to claim 3, wherein, when the HARQ adaptability attribute of the data packet is configured to be semi-adaptive HARQ, first scheduling information indicating a retransmitted packet of the data packet is preset to be consistent with first scheduling information indicating an initially transmitted packet of the data packet, or first scheduling information indicating an initially transmitted packet of the data packet is determined according to a predefined rule, wherein,
   the first scheduling information comprises at least one type of scheduling information selected from the group consisting of modulation and coding scheme (MCS), transmit power control (TPC), and demodulation reference signal cyclic shift.

5. A method for transmitting data, comprising:
   receiving downlink control information sent by a base station for scheduling a data packet; wherein the data packet is a transport block carried on an uplink shared channel and the downlink control information indicates the HARQ synchronization attribute and the HARQ process ID;
   determining a HARQ synchronization attribute of the data packet according to the downlink control information; and
   determining a HARQ process ID of the data packet according to the downlink control information when the HARQ synchronization attribute of the data packet is configured to be asynchronous HARQ,
   wherein the downlink control information includes a bit indicating the HARQ process ID, and wherein the bit also indicates the HARQ synchronization attribute, and wherein a first state of the bit indicates the HARQ process ID of the data packet, which indicates that the scheduled data packet uses synchronous HARQ, and a second state of the bit indicates the HARQ process ID of the data packet, which indicates that the schedule data packet uses asynchronous HARQ.

6. The method for transmitting data according to claim 5, further comprising:
obtaining a number of HARQ processes that were added by using high layer signaling from a base station.

7. The method for transmitting data according to claim 5, wherein a HARQ adaptability attribute of the data packet is adaptive HARQ or semi-adaptive HARQ when the HARQ synchronization attribute of the data packet is configured to be asynchronous HARQ.

8. The method for transmitting data according to claim 7, wherein, when the HARQ adaptability attribute of the data packet is configured to be semi-adaptive, first scheduling information indicating a retransmitted packet of the data packet is preset to be consistent with first scheduling information indicating an initially transmitted packet of the data packet, or first scheduling information indicating an initially transmitted packet of the data packet is determined according to a predefined rule, wherein,
the first scheduling information comprises at least one type of scheduling information selected from the group consisting of modulation and coding scheme (MCS), transmit power control (TPC), and demodulation reference signal cyclic shift.

9. A base station, comprising:
a non-transitory computer-readable storage medium to store program(s); and
computer hardware coupled to the non-transitory computer-readable medium and configured to, including configured by the program(s) to:
configure a hybrid automatic repeat request HARQ synchronization attribute of a data packet, wherein the HARQ synchronization attribute comprises synchronous HARQ or asynchronous HARQ, and the data packet is a transport block carried on an uplink shared channel;
configure a HARQ process ID of the data packet when the HARQ synchronization attribute of the data packet is configured to be asynchronous HARQ; and
send downlink control information for scheduling the data packet to a user equipment, wherein the downlink control information indicates the HARQ synchronization attribute and the HARQ process ID,
wherein the downlink control information includes a bit indicating the HARQ process ID, and wherein the bit also indicates the HARQ synchronization attribute, and
wherein a first state of the bit indicates the HARQ process ID of the data packet, which indicates that the scheduled data packet uses synchronous HARQ, and a second state of the bit indicates the HARQ process ID of the data packet, which indicates that the schedule data packet uses asynchronous HARQ.

10. The base station according to claim 9, further configured to notify the user equipment of a number of HARQ processes that were added by using high layer signaling.

11. The base station according to claim 9, further configured to:
set a HARQ adaptability attribute of the data packet to adaptive HARQ or semi-adaptive HARQ when the HARQ synchronization attribute of the data packet is configured to be asynchronous HARQ.

12. The base station according to claim 11, wherein, when the HARQ adaptability attribute of the data packet is configured to be semi-adaptive, first scheduling information indicating a retransmitted packet of the data packet is preset to be consistent with first scheduling information indicating an initially transmitted packet of the data packet, or first scheduling information indicating an initially transmitted packet of the data packet is determined according to a predefined rule, wherein,
the first scheduling information comprises at least one type of scheduling information selected from the group consisting of modulation and coding scheme (MCS), transmit power control (TPC), and demodulation reference signal cyclic shift.

13. A user equipment, comprising:
a non-transitory computer-readable storage medium to store program(s); and
computer hardware coupled to the non-transitory computer-readable medium and configured to implement, including configured by the program(s) to:
receive downlink control information sent by a base station for scheduling a data packet; wherein the data packet is a transport block carried on an uplink shared channel and the downlink control information indicates the HARQ synchronization attribute and the HARQ process ID;
determine a HARQ synchronization attribute of the data packet according to the downlink control information; and
determine a HARQ process ID of the data packet according to the downlink control information when the HARQ synchronization attribute of the data packet is configured to be asynchronous HARQ,
wherein the downlink control information includes a bit indicating the HARQ process ID, and wherein the bit also indicates the HARQ synchronization attribute, and
wherein a first state of the bit indicates the HARQ process ID of the data packet, which indicates that the scheduled data packet uses synchronous HARQ, and a second state of the bit indicates the HARQ process ID of the data packet, which indicates that the schedule data packet uses asynchronous HARQ.

14. The user equipment according to claim 13, further configured to:
obtain a number of HARQ processes that were added by using high layer signaling from a base station.

15. The user equipment according to claim 13, wherein a HARQ adaptability attribute of the data packet is adaptive HARQ or semi-adaptive HARQ when the HARQ synchronization attribute of the data packet is configured to be asynchronous HARQ.

16. The user equipment according to claim 15, wherein, when the HARQ adaptability attribute of the data packet is configured to be semi-adaptive, first scheduling information indicating a retransmitted packet of the data packet is preset to be consistent with first scheduling information indicating an initially transmitted packet of the data packet, or first scheduling information indicating an initially transmitted packet of the data packet is determined according to a predefined rule, wherein,
the first scheduling information comprises at least one type of scheduling information selected from the group consisting of modulation and coding scheme (MCS), transmit power control (TPC), and demodulation reference signal cyclic shift.

* * * * *